US010708090B1

(12) United States Patent
Lo et al.

(10) Patent No.: US 10,708,090 B1
(45) Date of Patent: Jul. 7, 2020

(54) MILLIMETER WAVE CHANNEL ESTIMATION METHOD

(71) Applicant: INDUSTRIAL TECHNOLOGY RESEARCH INSTITUTE, Hsinchu (TW)

(72) Inventors: Hsin Yuan Lo, Taoyuan (TW); Shang-Ho Tsai, Hsinchu (TW); Kuo Chen Ho, Hsinchu County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/234,134

(22) Filed: Dec. 27, 2018

(51) Int. Cl.
H04W 72/04 (2009.01)
H04L 25/02 (2006.01)
H04B 7/06 (2006.01)

(52) U.S. Cl.
CPC ....... H04L 25/0246 (2013.01); H04B 7/0663 (2013.01)

(58) Field of Classification Search
None
See application file for complete search history.

(56) References Cited

U.S. PATENT DOCUMENTS

| 8,644,411 | B2 | 2/2014 | Kotecha et al. |
| 9,641,357 | B1 | 5/2017 | Pajovic et al. |
| 9,853,702 | B1 | 12/2017 | Liang et al. |
| 9,948,377 | B1* | 4/2018 | Kim ............ H04B 7/0691 |
| 2010/0001901 | A1* | 1/2010 | Baraniuk .......... G01S 13/904 342/25 F |
| 2012/0230380 | A1 | 9/2012 | Keusgen et al. |
| 2012/0314822 | A1* | 12/2012 | Gupta ........... H03M 7/3062 375/346 |

(Continued)

FOREIGN PATENT DOCUMENTS

| CN | 104994041 A | 10/2015 |
| CN | 106559114 A | 4/2017 |

(Continued)

OTHER PUBLICATIONS

Alkhateeb, A., et al., "Channel Estimation and Hybrid Precoding for Millimeter Wave Cellular Systems," IEEE Journal of Selected Topics in Signal Processing, vol. 8, Issue 5, pp. 831-846 (Oct. 2014).

(Continued)

Primary Examiner — Sithu Ko
(74) Attorney, Agent, or Firm — Maschoff Brennan

(57) ABSTRACT

A millimeter wave channel estimation method comprises sending signals through a millimeter wave channel according to a first beamforming matrix, performing a channel estimation on the millimeter wave to generate a first measured matrix, and estimating and obtaining at least one angle of departure of the millimeter wave channel according to the first measured matrix and an angle compressive sensing matrix. The first beamforming matrix comprises a plurality of first beamforming vectors, and the first beamforming vectors respectively corresponds to a plurality of first beamforming patterns. The first measured matrix comprises a plurality of first measured parameters respectively corresponding to the first beamforming vectors.

10 Claims, 6 Drawing Sheets

(56) References Cited

U.S. PATENT DOCUMENTS

| | | | | |
|---|---|---|---|---|
| 2013/0272263 A1* | 10/2013 | Pi | ................. | H04B 7/0626 370/330 |
| 2014/0044044 A1* | 2/2014 | Josiam | ................. | H04B 7/0632 370/328 |
| 2014/0146909 A1* | 5/2014 | Zhang | ................. | H04B 7/0626 375/267 |
| 2016/0218779 A1* | 7/2016 | Lee | ................. | H04B 7/0408 |
| 2016/0218890 A1 | 7/2016 | Sanderovich | | |
| 2017/0315221 A1 | 11/2017 | Cohen et al. | | |
| 2018/0128892 A1* | 5/2018 | Granato | ................. | G01S 13/42 |
| 2018/0248596 A1 | 8/2018 | Xiao et al. | | |
| 2018/0269934 A1* | 9/2018 | Kim | ................. | H04B 7/0417 |
| 2019/0289568 A1* | 9/2019 | Pajovic | ................. | G01S 5/0273 |
| 2019/0319822 A1* | 10/2019 | Heath, Jr. | ................. | H04B 7/0617 |

FOREIGN PATENT DOCUMENTS

| | | |
|---|---|---|
| CN | 106559367 A | 4/2017 |
| CN | 104698430 B | 6/2017 |
| CN | 107040296 A | 8/2017 |
| CN | 107171985 A | 9/2017 |
| CN | 108111208 A | 6/2018 |
| EP | 3297236 A1 | 3/2018 |
| TW | 201815095 A | 4/2018 |
| WO | 2018/089082 A1 | 5/2018 |

OTHER PUBLICATIONS

Akdeniz, R., M., et al., "Millimeter wave channel modeling and cellular capacity evaluation," IEEE Journal on Selected Areas in Communications, vol. 32, Issue 6, pp. 1164-1179 (Jun. 2014).

Ayach, E., O., et al., "Spatially sparse precoding in millimeter wave MIMO systems," IEEE Transactions on Wireless Communications, vol. 13, Issue 3, pp. 1499-1513 (Mar. 2014).

Donno, D., D., et al., "Hybrid Analog-Digital Beam Training for mmWave Systems with Low-Resolution RF Phase Shifters," 2016 IEEE International Conference on Communications Workshops (ICC), pp. 6 (2016).

Lee, J., et al., "Channel estimation via orthogonal matching pursuit for hybrid MIMO systems in millimeter wave commmunications," IEEE Transactions on Communications, vol. 64, Issue 6, pp. 2370-2386 (Jun. 2016).

Mendez-Rial, R., et al., "Channel estimation and hybrid combining for mmWave: Phase shifters or switches?," 2015 Information Theory and Applications Workshop (ITA), pp. 1-8 (2015).

Mo, J., et al., "Channel estimation in millimeter wave MIMO systems with one-bit quantization," 2014 48th Asilomar Conference on Signals, Systems and Computers, pp. 957-961 (Nov. 2014).

Rappaport, S., T., et al., "Millimeter wave mobile communications for 5G cellular: it will work," IEEE Access pratical Innovations: open solutions, vol. 1, pp. 335-349 (2013).

Sun, S., and Rappaport, S., T., "Millimeter Wave MIMO Channel Estimation Based on Adaptive Compressed Sensing," The 10th International Workshop on Evolutional Technologies & Ecosystems for 5G and Beyond (WDN-5G ICC2017), pp. 7 (2017).

Venugopal, K., et al., "Channel estimation for hybrid architecture-based wideband millimeter wave systems," IEEE Journal on Selected Areas in Communications, vol. 35, Issue 9, pp. 1996-2009 (Sep. 2017).

TW Office Action in application No. 107147452 dated Sep. 5, 2019.

* cited by examiner

MILLIMETER WAVE CHANNEL ESTIMATION METHOD

BACKGROUND

1. Technical Field

This disclosure relates to a channel estimation method, and particularly to a millimeter wave channel estimation method.

2. Related Art

With the development of wireless communication technology, in order to meet the requirements of higher speed and wider bandwidth, the fifth generation mobile communication standard has been established. However, since the low and medium frequency bands in the current spectrum have been used by other wireless communication technologies, the application of millimeter waves in the high frequency band becomes the focus of recent and future wireless communication technology.

At present, the millimeter wave channel estimation is implemented by exhaustive search. The implementation of exhaustive search comprises sending beams at regular intervals of angle of resolution, receiving the beams so as to generate measurement data by the receiving terminal, and using the measurement data to calculate and estimate the channel. However, as the requirements for resolution increase, the number of times of measurements and the quantity of calculation of this method also increase significantly, resulting in a large amount of time consumption.

SUMMARY

According to an embodiment of this disclosure, a millimeter wave channel estimation method comprises sending signals through a millimeter wave channel according to a first beamforming matrix, performing a channel estimation on the millimeter wave to generate a first measured matrix, and estimating and obtaining at least one angle of departure of the millimeter wave channel according to the first measured matrix and an angle compressive sensing matrix. The first beamforming matrix comprises a plurality of first beamforming vectors, and the first beamforming vectors respectively corresponds to a plurality of first beamforming patterns. The first measured matrix comprises a plurality of first measured parameters respectively corresponding to the first beamforming vectors.

According to an embodiment of this disclosure, a millimeter wave channel estimation method comprises receiving signals from a millimeter wave channel according to a first beamforming matrix to generate a first measured matrix, and estimating and obtaining at least one angle of arrival of the millimeter wave channel according to the first measured matrix and an angle compressive sensing matrix. The first beamforming matrix comprises a plurality of first beamforming vectors respectively corresponding to a plurality of first beamforming patterns, and the first measured matrix comprises a plurality of first measured parameters respectively corresponding to the first beamforming vectors.

DETAILED DESCRIPTION

Figure 1:
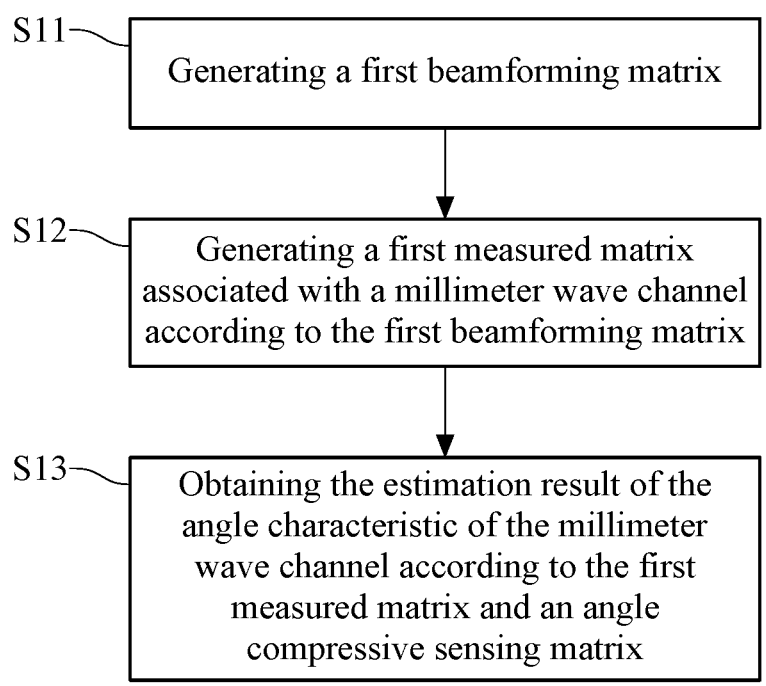
FIG. 1 is a flowchart of a millimeter wave channel estimation method according to an exemplary embodiment of this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

This disclosure provides a millimeter wave channel estimation method applied to a communication system which transmits wireless signals through a millimeter wave channel. Please refer to FIG. 1 which is a flowchart of a millimeter wave channel estimation method according to an exemplary embodiment of this disclosure. In step S11, the communication system, as described above for transmitting wireless signals through the millimeter wave channel, generates a first beamforming matrix, with the first beamforming matrix comprising first beamforming vectors which respectively correspond to first beamforming patterns. It should be noted that the step S11 of generating the first beamforming matrix is an optional step; that is, in other exemplary embodiments, the first beamforming matrix can be pre-stored in the communication system, so that the communication system can performs steps S12 and S13 as follows without step S11 during the implementation of a millimeter wave channel estimation method.

In step S12, the communication system generates a first measured matrix associated with the millimeter wave channel according to the first beamforming matrix generated in step S11. The first measured matrix comprises first measured parameters which respectively correspond to the first beamforming vectors in the first beamforming matrix. More particularly, the first measured parameters in the first measured matrix can have a one-to-one relationship with the first beamforming vectors in the first beamforming matrix. In an exemplary embodiment, the step of generating the first measured matrix associated with the millimeter wave channel according to the first beamforming matrix can be implemented by the communication system by sending signals through the millimeter wave channel according to the first beamforming matrix, and performing a channel estimation to generate the first measured matrix; in another exemplary embodiment, the step can be implemented by receiving signals from the millimeter wave channel according to the first beamforming matrix so as to generate the first measured matrix. The operating environment for these two exemplary embodiments is described in details later.

In step S13, the communication system estimate and obtain the estimation result of the angle characteristic of the millimeter wave channel according to the first measured matrix and an angle compressive sensing matrix. The angle compressive sensing matrix comprises the aforementioned first beamforming matrix and an angle matrix, wherein the angle matrix comprises angle parameters each of which has a base number and an exponent. In an exemplary embodiment, the base number of every angle parameter has is a mathematical constant e, and the exponents of these angle parameter respectively involve different angle values. For example, the angle parameters can be represented by $e^{jkd \sin \theta_i}$.

Figure 2:
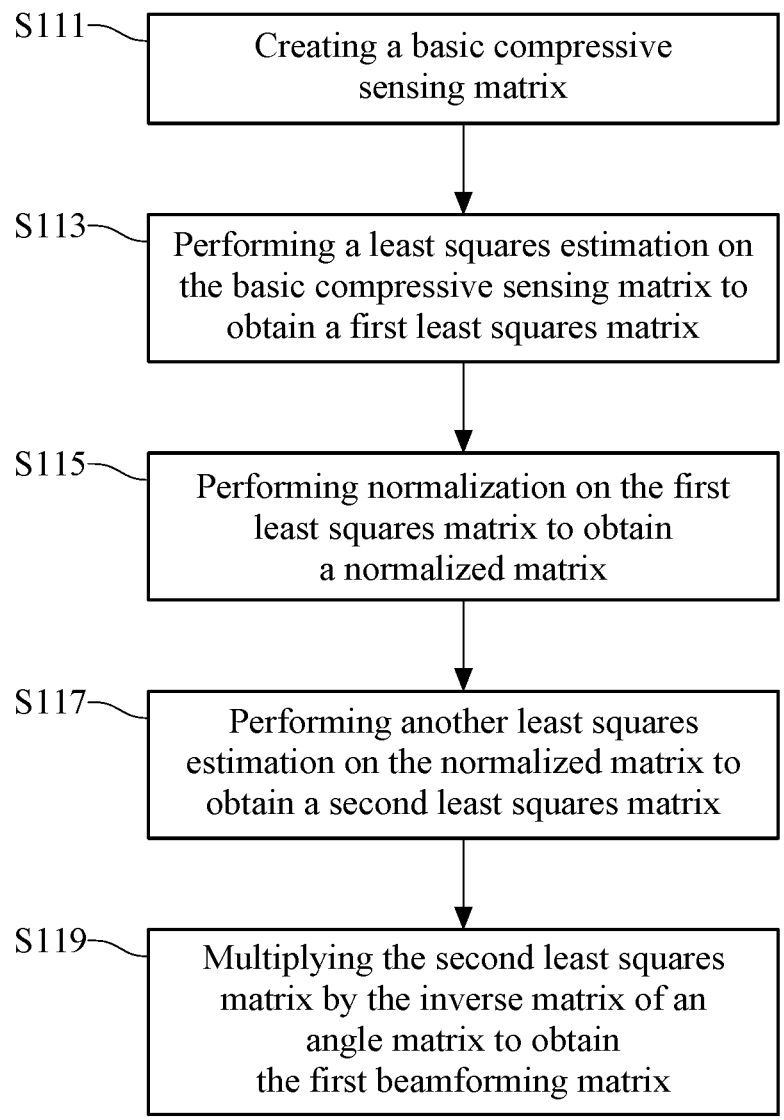
FIG. 2 is a flowchart of the step of generating a first beamforming matrix in a millimeter wave channel estimation method according to an exemplary embodiment of this disclosure.

Please refer to FIG. 2 for particularly describing the step of generating the first beamforming matrix (i.e. step S11 of FIG. 1). FIG. 2 is a flowchart of the step of generating a first beamforming matrix in a millimeter wave channel estimation method according to an exemplary embodiment of this disclosure. In step S111, the communication system creates a basic compressive sensing matrix. For example, the basic compressive sensing matrix is a Gabor frame which is a m*m2 matrix. More particularly, m can be a prime number of 5 or more; that is, the dimension of a Gabor frame can be greater than 5*25. In an exemplary embodiment, the Gabor frame can be represented by an exponential function, wherein the base number of the exponential function is a mathematical constant e, and its exponent involves a constant m which associated with the number of times the estimation is to be performed in the subsequent estimation step. For example, the basic compressive sensing matrix $A_G$ can be represented by the following equation:

$$A_G(i_1+1, (i_2+1)+m(i_3+1)) = e^{\frac{j2\pi((i_1-i_3)^3+i_1 i_2)}{m}},$$

wherein $i_1, i_2, i_3 = 0, 1, \ldots,$ m−1; that is, $i_1$ is 0, 1, ..., m−2 or m−1; $i_2$ is 0, 1, ..., m−2 or m−1; and $i_3$ is 0, 1, ..., m−2 or m−1.

In step S113, the communication system performs a least squares estimation on the basic compressive sensing matrix to obtain a first least squares matrix. More specifically, the communication system designs a precoding matrix F, calculates the matrix product of the conjugate transpose of the angle matrix $A_\theta$ and the precoding matrix F, and then obtains the matrix solution $F_{opt}$ of the precoding matrix for minimizing the sum of squares of the difference between the transpose of the basic compressive sensing matrix $A_G$ and the above matrix product. Another matrix product of the transpose of the matrix solution $F_{opt}$ and the conjugate transpose of the angle matrix $A_\theta$ is considered to be the first least squares matrix $A_{LS}$. The calculation procedure of step S113 can be exemplarily shown in the following equation:

$$F_{opt} = (A_\theta A_\theta^H)^{-1} A_\theta A_G^T; \text{ let } F_{opt}^T A^*_\theta = A_{LS}.$$

In step S115, the communication system performs normalization on the first least squares matrix obtained in step S113 to obtain a normalized matrix, wherein the detailed calculation of the normalization can be understood by those having ordinary skills in the art, and is not described herein. In step S117, the communication system performs another least squares estimation on the normalized matrix to obtain a second least squares matrix, wherein the detailed calculation of the least squares estimation is the same as or similar to that of step S113 as previously mentioned, and is not repeated. In step S119, the communication system multiplies the second least squares matrix by the inverse matrix of the angle matrix to obtain the first beamforming matrix.

Figure 3:
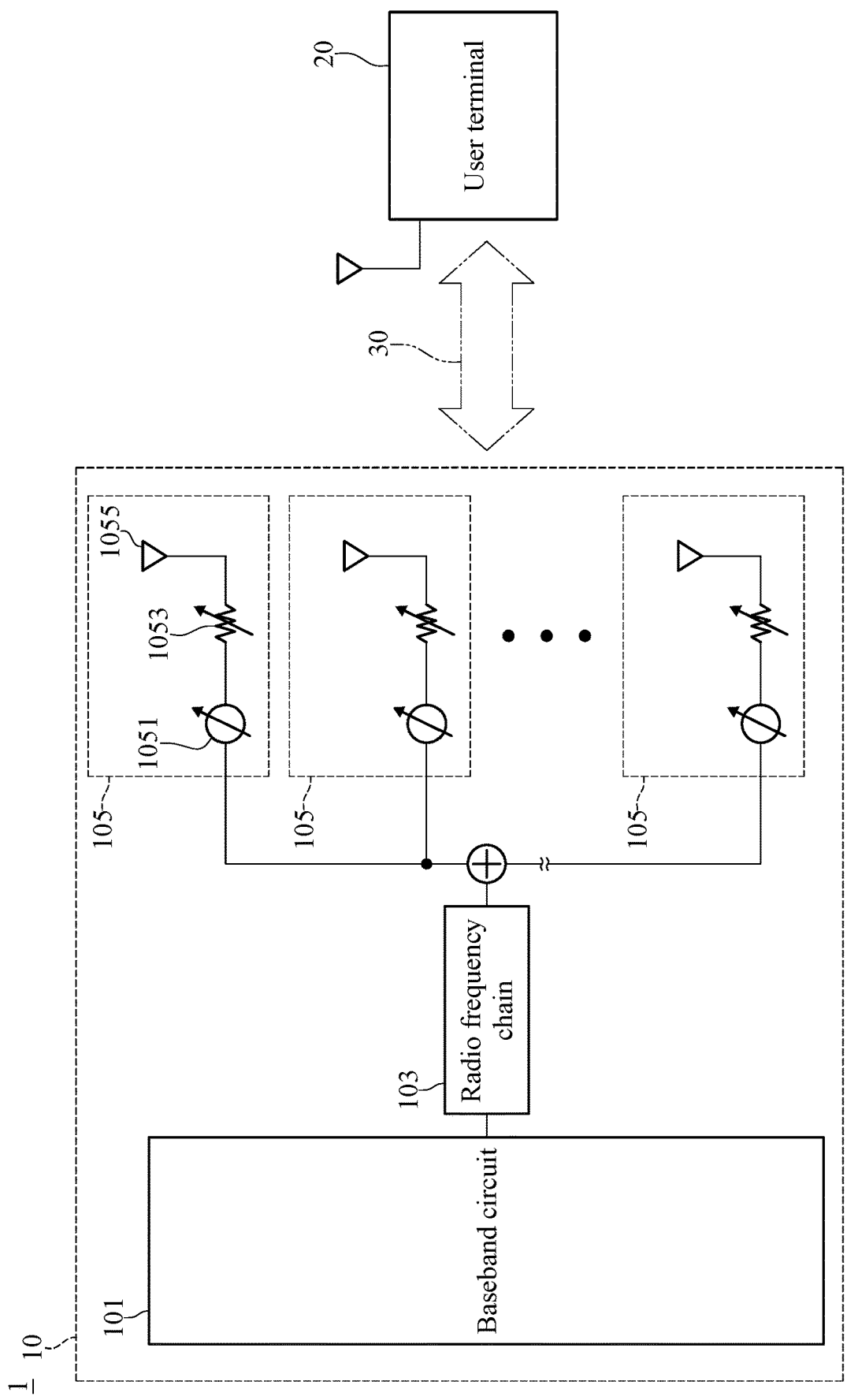
FIG. 3 is a functional block diagram of a communication system according to an exemplary embodiment of this disclosure.
Figure 4:
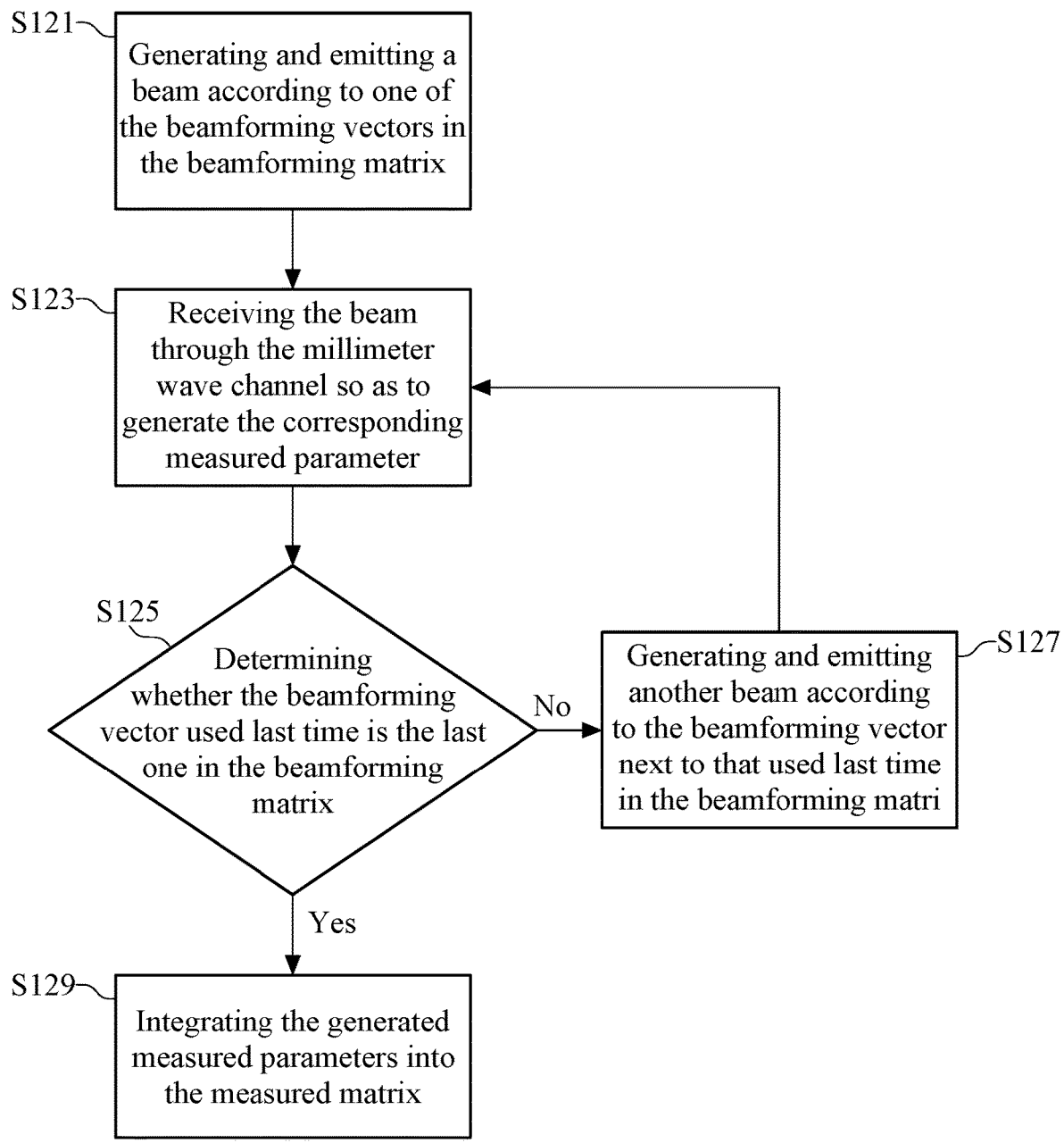
FIG. 4 is a flowchart of the step of generating the measured matrix in a millimeter wave channel estimation method according to an exemplary embodiment of this disclosure.

As aforementioned, the millimeter wave channel estimation method provided in this disclosure is applied to the communication system transmitting wireless signals through a millimeter wave channel. More particularly, please refer to FIGS. 1, 3 and 4 for illustrating one exemplary embodiment of the communication system and the details of the millimeter wave channel estimation method. FIG. 3 is a functional block diagram of a communication system according to an exemplary embodiment of this disclosure, and FIG. 4 is a flowchart of the step of generating the measured matrix in a millimeter wave channel estimation method according to an exemplary embodiment of this disclosure.

As shown in FIG. 3, the communication system 1 comprises a base station 10 and a user terminal 20 which transmit wireless signals to each other through a millimeter wave channel 30. The base station 10 comprises a baseband circuit 101, a radio frequency chain 103 and signal transceivers 105. Each signal transceiver 105 comprises a phase modulation circuit 1051, an impedance modulation circuit 1053 and an antenna 1055. The base station 10 can also comprise a signal generator and a precoder such as a computer, or be externally connected with a generator and a precoder in the communication system 1. The user terminal 20 can receive the wireless signals from the base station 10 through the millimeter wave channel 30 so as to download data, and can also send wireless signals to the base station 10 through the millimeter wave channel 30 so as to upload data. For example, the user terminal 20 is a mobile phone, a notebook computer or other user device with a wireless signal transceiver, which is not limited in this disclosure.

In an exemplary embodiment, the estimation of the millimeter wave channel 30 can be implemented by the communication system 1 by using the base station 10 to send wireless signals and using the user terminal 20 to receive them. This implementation includes steps S12 and S13, or steps S11-S13 in FIG. 1 as aforementioned. In step S11 in this exemplary embodiment, the communication system 1 generates the first beamforming matrix which comprises first beamforming vectors by the precoder of the base station 10.

The details of this generating step are the same as or similar to those in the aforementioned exemplary embodiments, and are not repeated herein.

In step S12, the communication system 1 generates the first measured matrix according to the first beamforming matrix. More particularly, the communication system 1 generates and emits a beam according to one of the first beamforming vectors generated by the base station 10 in step S11. For example, the base station 10 can generate the beam having a radiation field of the first beamforming pattern corresponding to said one of the first beamforming vectors. More specifically, each of the first beamforming vectors comprises phase modulation values respectively for the antennas 1055 and impedance modulation values respectively for the antennas 1055. The base station 10 can control the phase modulation circuit 1051 and the impedance modulation circuit 1053 of each signal transceiver 105 according to the selected first beamforming vector, so as to modulate the phase and amplitude of the electromagnetic wave (wireless signal) emitted by a respectively one of the antennas 1055. The electromagnetic waves respectively emitted by the antennas 1055 together form the radiation field of the first beamforming pattern corresponding to the selected first beamforming vector. The communication system 1 receives the beam with the radiation field of the first beamforming pattern to generate a first measured parameter. This first measured parameter corresponds to the first beamforming vector as aforementioned for generating the beam, and serves one of parameters in the first measured matrix.

In this exemplary embodiment, the base station 10 serves as the terminal of sending wireless signals, and the user terminal 20 serves as the terminal of receiving the wireless signals. More specifically, step S12 in FIG. 1 can comprise steps S121, S123, S125, S127 and S129 as shown in FIG. 4. In step S121, the base station 10 generates and emits a beam according to one of the beamforming vectors, such as the first one, in the beamforming matrix (the aforementioned first beamforming matrix). In step S123, the user terminal 20 receives the beam from the base station 10 through the millimeter wave channel 30, so as to generate the corresponding measured parameter. In step S125, the base station 10 determines whether the beamforming vector used last time is the last one in the beamforming matrix. When the determining result is no, as shown in the description of step S127, the base station 10 generates and emits another beam according to the beamforming vector next to that used last time in the beamforming matrix, and then the user terminal 20 preformed step S123; if the determining result is yes, as shown in the description of step S129, the user terminal 20 integrates the generated measured parameters into the measured matrix. For example, if the beamforming matrix has m of beamforming vectors, the receiving terminal of wireless signals can correspondingly generate m of measured parameters so as to from a m*1 measured matrix (i.e. first measured matrix) after the steps described above.

In sum, the communication system 1 can use the base station 10 to generate beams multiple times respectively according to the beamforming vectors, and use the user terminal 20 to receive these beams to respectively generate measured parameters and to integrate these measured parameters into a measured matrix. The exemplary embodiment of FIG. 4 exemplarily illustrates that the base station 10 generates beams sequentially according to the beamforming vectors in the beamforming matrix; however, this disclosure does not limit the order in which the base station uses beamforming vectors is equivalent to the order in the matrix.

In step S13, the user terminal 20 obtains the estimation result of the angle characteristic of the millimeter wave channel 30 according to the first measured matrix and the angle compressive sensing matrix. In this exemplary embodiment, the estimation result of the angle characteristic comprises at least one angle of departure (AOD). More specifically, a compressive sensing recovery algorithm is stored in the user terminal 20, such as the following equation:

$$Y=\phi\alpha$$

y indicates the measured matrix; $\phi$ indicates the angle compressive sensing matrix; $\alpha$ indicates the desired estimation result of the angle characteristic. As aforementioned in step S119 of generating the first beamforming matrix in FIG. 2, the first beamforming matrix is obtained by multiplying the angle compressive sensing matrix (i.e. the aforementioned second least squares matrix) by the inverse matrix of the angle matrix. In other words, the millimeter wave channel estimation method provided in this disclosure separates the angle compressive sensing matrix as the first beamforming matrix and the angle matrix, as shown in the following equation:

$$y = \phi\alpha = [\, f_1 \quad f_2 \quad \ldots \quad f_m \,]^T [\ldots \quad e^{jkd\sin\theta_i} \quad \ldots] \begin{bmatrix} \vdots \\ \alpha \\ \vdots \end{bmatrix}.$$

By the above recovery algorithm, the estimation result of the angle characteristic can be calculated using the first beamforming matrix generated in step S11, the first measured matrix obtained in step S12 and the known angle matrix. The estimation result of the angle characteristic can comprise angle estimated parameters which have a one-to-one relationship with the angle parameters in the angle matrix, and each of these angle estimated parameters can indicate whether there is a wireless signal (beam) is received at the angle represented by the respective one of the angle parameters, or indicate whether the strength of the wireless signal received at the angle represented by the respective one of the angle parameters is larger than the predetermined threshold. For example, when the strength of the wireless signal which passes through the millimeter wave channel and is then received at a specific angle by the signal receiving terminal is not larger than the predetermined threshold, the angle estimated parameter corresponding to the specific angle is zero; when the strength of the wireless signal which passes through the millimeter wave channel and is then received at a specific angle by the signal receiving terminal is larger than the predetermined threshold, the angle estimated parameter corresponding to the specific angle is not zero.

In comparison with the conventional exhaustive search method, the number of times of measurements in the millimeter wave channel estimation method of this disclosure depends on the parameter design of the beamforming matrix, and might not increase as the resolution of wireless communication increases; therefore, it may avoid a large amount of measurement data and calculation time due to high-resolution requirements, and then achieve rapid millimeter wave channel estimation.

In another exemplary embodiment, the estimation of the millimeter wave channel 30 can be implemented by the communication system 1 by using the user terminal 20 to send wireless signals and using the base station 10 to receive them. This implementation includes steps S12 and S13, or steps S11-S13 in FIG. 1 as aforementioned. In step S11 in this exemplary embodiment, the communication system 1 generates the first beamforming matrix which comprises first beamforming vectors by the base station 10. The details of this generating step are the same as or similar to those in the aforementioned exemplary embodiments, and are not repeated herein.

In step S12, the communication system 1 generates the first measured matrix according to the first beamforming matrix first measured matrix. More particularly, the communication system 1 uses the user terminal 20 to send signals, and then uses the base station 10 to receive the signals through one of the first beamforming vectors generated in step S11, so as to generate the corresponding first measured parameter which serves as one of parameters in the first measured matrix. In this exemplary embodiment, the base station 10 can receive signals multiple times respectively through the first beamforming vectors, so as to generate the first measured parameters respectively corresponding to the first beamforming vectors. For example, the base station 10 can receive the signals sequentially according to the first beamforming vectors in the first beamforming matrix, which is similar but not limited to the procedure shown in FIG. 4. The base station 10 can integrate the generated first measured parameters into the first measured matrix.

In step S13, the base station 10 can obtain the estimation result of the angle characteristic of the millimeter wave channel 30 according to the first measured matrix, the angle compressive sensing matrix, the first beamforming matrix and the angle matrix. The estimation result of the angle characteristic comprises at least one angle of arrival (AOA). A compressive sensing recovery algorithm is stored in the base station 10 wherein the equation and the detailed calculation of the compressive sensing recovery algorithm are similar to those described in the preceding exemplary embodiment, and are not repeated. In this exemplary embodiment, the base station 10 has both functions of generating beamforming vectors and calculating angle characteristics.

In yet another exemplary embodiment, each of the base station 10 and the user terminal 20 of the communication system 1 has the compressive sensing recovery algorithm stored therein. By the millimeter wave channel estimation method as described in any one of the above exemplary embodiments, whether the user terminal performs uploading or downloading, the communication system 1 can estimate the millimeter wave channel 30.

Figure 5:
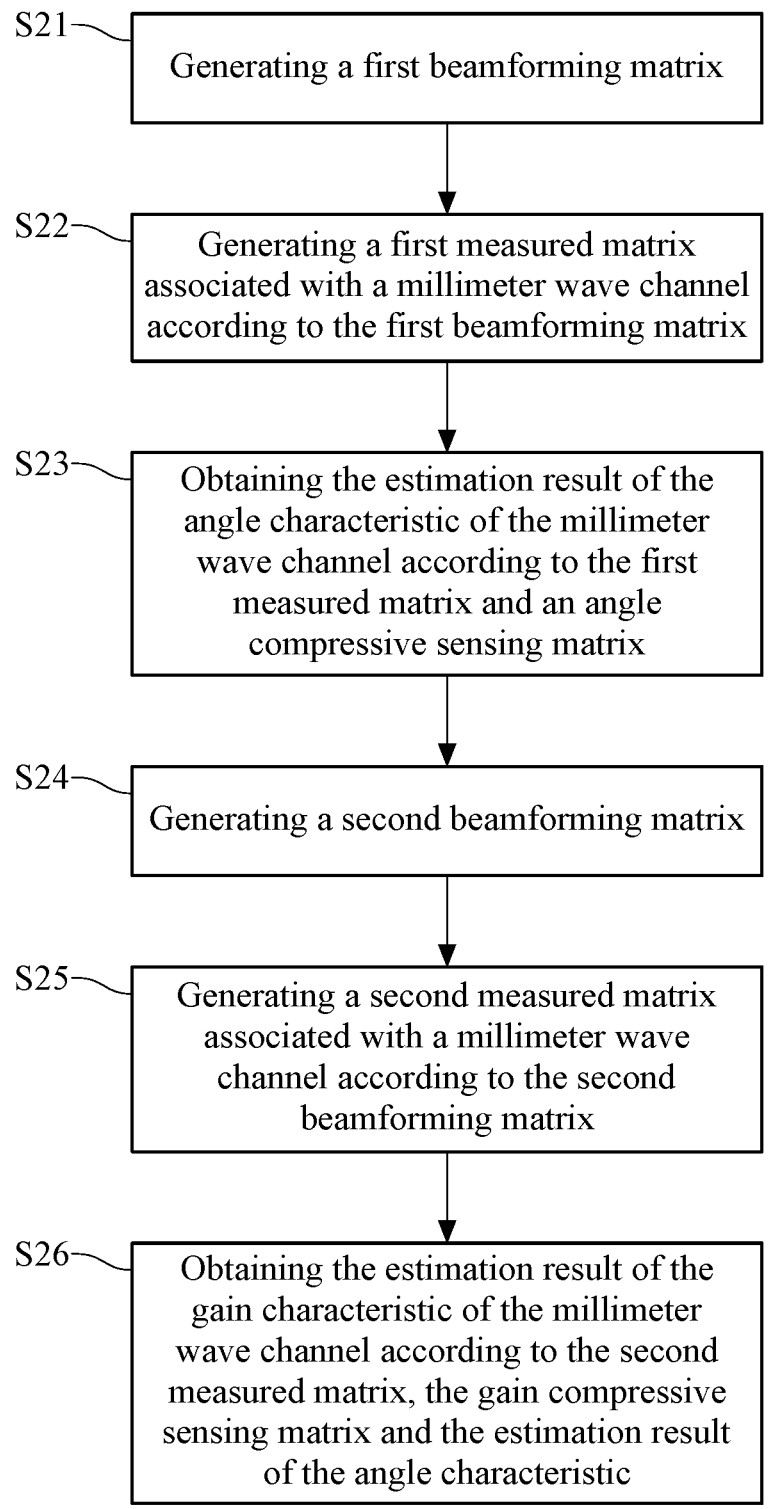
FIG. 5 is a flowchart of a millimeter wave channel estimation method according to another exemplary embodiment of this disclosure.
Figure 6:
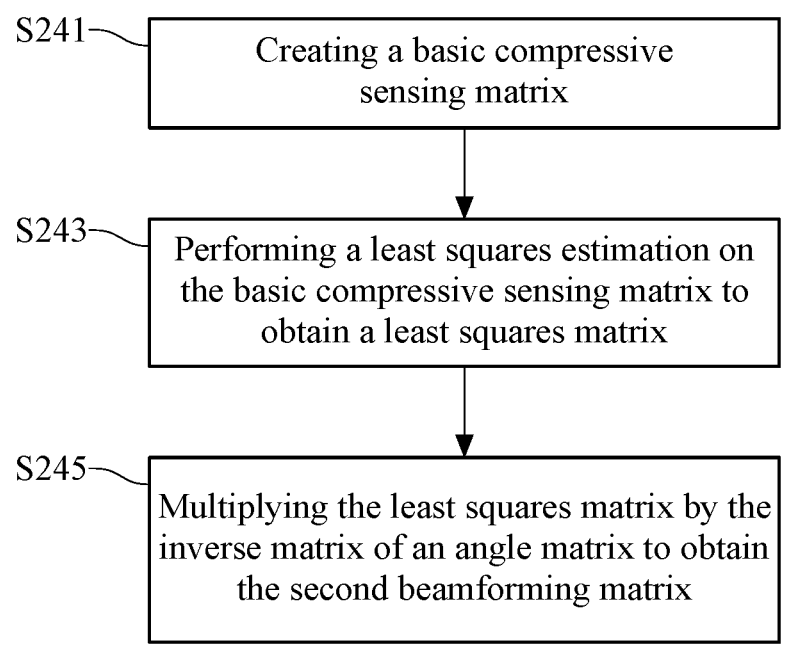
FIG. 6 is a flowchart of the step of generating a second beamforming matrix in a millimeter wave channel estimation method according to another exemplary embodiment of this disclosure.

Please refer to FIGS. 3, 5 and 6, wherein FIG. 5 is a flowchart of a millimeter wave channel estimation method according to another exemplary embodiment of this disclosure, and FIG. 6 is a flowchart of the step of generating a second beamforming matrix in a millimeter wave channel estimation method according to another exemplary embodiment of this disclosure. The millimeter wave channel estimation method as shown in FIG. 5 is also applied to the communication system 1 as shown in FIG. 3, so the implementation of the millimeter wave channel estimation method in FIG. 5 is exemplarily described below by the communication system 1. In steps S21-S23, the communication system 1 generates a first beamforming matrix by the base station 10, generates a first measured matrix associated with the millimeter wave channel 30 according to the first beamforming matrix, and obtains the estimation result of the angle characteristic of the millimeter wave channel 30 according to the first measured matrix and an angle compressive sensing matrix. These steps are the same as or similar to steps S11-S13 in the aforementioned exemplary embodiment of FIG. 1, so the detailed implementation of each step is not repeated.

In the exemplary embodiment as shown in FIG. 5, after obtaining the estimation result of the angle characteristic of the millimeter wave channel 30, the communication system 1 further performs another channel estimation on the millimeter wave channel 30 using the second beamforming matrix. In step S24, the communication system 1 generates a second beamforming matrix by the base station 10, wherein the second beamforming matrix comprises second beamforming vectors. More particularly, FIG. 6 illustrates an implementation of generating the second beamforming matrix. In step S241, the base station 10 creates a basic compressive sensing matrix, such as a Gabor frame. In step S243, the base station 10 performs a least squares estimation on the basic compressive sensing matrix to obtain a least squares matrix. The above steps S241 and S243 are the same as or similar to steps S111 and S113 in the aforementioned exemplary embodiment of FIG. 2, so their details are not repeated. In step S245, the base station 10 multiplies the least squares matrix by the inverse matrix of the angle matrix (as mentioned in the aforementioned exemplary embodiment) to obtain the second beamforming matrix.

It should be noted that, FIG. 5 just exemplarily illustrates step S24 of generating the second beamforming matrix after step S23 of obtaining the estimation result of the angle characteristic; however, in other embodiments, step S24 can be performed before or after any one of steps S21-S23, which is not limited in this disclosure. Moreover, as described previously, steps S241 and S243 of generating the second beamforming matrix are the same as or similar to steps S111 and 113 of generating the first beamforming matrix; therefore, in an exemplary embodiment, the base station 10 can generate the second beamforming matrix while it performs step S21 to generate the first beamforming matrix. In addition, both of the aforementioned step S21 and step S24 are optional steps, so in other exemplary embodiments, the first and second beamforming matrices can be pre-stored in the communication system 1, and the communication system 1 can perform steps S22 and S23 as above and then steps S25 and S26 as below without steps S21 and S24 during the implementation of a millimeter wave channel estimation method.

After obtaining the second beamforming matrix, the communication system 1 can estimate another characteristic of the millimeter wave channel 30 by this beamforming matrix, as shown in steps S25 and S26 in FIG. 5. In step S25, the communication system 1 generates a second measured matrix associated with the millimeter wave channel 30 according to the second beamforming matrix, wherein the second measured matrix comprises second measured parameters which respectively correspond the second beamforming vectors. More particularly, the second measured parameters in the second measured matrix can have a one-to-one relationship with the second beamforming vectors in the second beamforming matrix. The detailed implementation of step S25 is similar to that of generating the first measured matrix according to the first beamforming matrix as aforementioned, so is not repeated herein.

In step S26, the communication system 1 obtains the estimation result of the gain characteristic of the millimeter wave channel 30 according to the second measured matrix, a gain compressive sensing matrix and the estimation result of the angle characteristic obtained in step S23. The gain compressive sensing matrix comprises the second beamforming matrix and the angle matrix. More particularly, the communication system 1 can obtain the estimation result of the gain characteristic by the compressive sensing recovery algorithm as described in the above exemplary embodiment; that is, the gain corresponding to the estimation result of the angle characteristic can be obtained according to the estimation result of the angle characteristic.

In the exemplary embodiment of sending signals according to the second beamforming matrix and performing the channel estimation, the estimation result of the gain characteristic obtained by the communication system 1 comprises at least one signal gain which corresponds to said at least one angle of departure obtained in the first stage of the estimation (i.e. steps S21-S23). In the exemplary embodiment of receiving signals according to the second beamforming matrix and performing the channel estimation, the estimation result of the gain characteristic obtained by the communication system 1 comprises at least one signal gain which corresponds to said at least one angle of arrival obtained in the first stage of the estimation. By performing the aforementioned steps S21-S26, the communication system 1 can obtain the estimated value of the angle of departure or the angle of arrival and the estimated value of the corresponding gain respectively through two stages of estimation, so that an accurate millimeter wave channel estimation may be achieved.

In view of the above description, the millimeter wave channel estimation method provided in this disclosure generates beamforming vectors based on the theory of compressive sensing, generates measured parameters associated with a millimeter wave channel according to these beamforming vectors, and obtains the estimation result of the angle characteristic of the millimeter wave channel from the measured parameters, the beamforming vectors and angle parameters by compressive sensing recovery technique. The millimeter wave channel estimation method in this disclosure may have no need for producing the feedback of the measurement data, and may estimate the characteristic parameters of the channel by a small number of measurement times so as to achieve rapid millimeter wave channel estimation and to improve the quality of the subsequent transmission of signals/data. More particularly, in comparison with estimating all characteristic parameters of a channel in a single stage, estimating angle characteristic parameters and gain characteristic parameters respectively in two stage may obtain the more accurate estimation results.

What is claimed is:

1. A millimeter wave channel estimation method, comprising:
   sending signals through a millimeter wave channel according to a first beamforming matrix, with the first beamforming matrix comprising a plurality of first beamforming vectors, and the first beamforming vectors respectively corresponding to a plurality of first beamforming patterns;
   performing a channel estimation on the millimeter wave channel to generate a first measured matrix, with the first measured matrix comprising a plurality of first measured parameters respectively corresponding to the first beamforming vectors; and
   estimating and obtaining at least one angle of departure of the millimeter wave channel according to the first measured matrix and an angle compressive sensing matrix;
   wherein the millimeter wave channel estimation method further comprising generating the first beamforming matrix, wherein generating the first beamforming matrix comprises:
   creating a basic compressive sensing matrix;
   performing a least squares estimation on the basic compressive sensing matrix to obtain a first least squares matrix;
   performing normalization on the first least squares matrix to obtain a normalized matrix;
   performing another least squares estimation on the normalized matrix to obtain a second least squares matrix; and
   multiplying the second least squares matrix by an inverse matrix of an angle matrix to obtain the first beamforming matrix.

2. The millimeter wave channel estimation method according to claim 1, further comprising:
   sending signals through the millimeter wave channel according to a second beamforming matrix, with the second beamforming matrix comprising a plurality of second beamforming vectors, and the second beamforming vectors respectively corresponding to a plurality of second beamforming patterns;
   performing another channel estimation on the millimeter wave channel to generate a second measured matrix, with the second measured matrix comprising a plurality of second measured parameters respectively corresponding to the second beamforming vectors; and
   estimating and obtaining at least one signal gain corresponding to said at least one angle of departure according to the second measured matrix, a gain compressive sensing matrix and said at least one angle of departure.

3. The millimeter wave channel estimation method according to claim 2, further comprising generating the second beamforming matrix, wherein generating the second beamforming matrix comprises:
   creating a basic compressive sensing matrix;
   performing a least squares estimation on the basic compressive sensing matrix to obtain a least squares matrix; and
   multiplying the least squares matrix by an inverse matrix of an angle matrix to obtain the second beamforming matrix.

4. The millimeter wave channel estimation method according to claim 3, wherein the basic compressive sensing matrix is a Gabor frame.

5. The millimeter wave channel estimation method according to claim 1, wherein the basic compressive sensing matrix is a Gabor frame.

6. A millimeter wave channel estimation method, comprising:
   receiving signals from a millimeter wave channel according to a first beamforming matrix to generate a first measured matrix; and
   estimating and obtaining at least one angle of arrival of the millimeter wave channel according to the first measured matrix and an angle compressive sensing matrix;
   wherein the first beamforming matrix comprises a plurality of first beamforming vectors respectively corresponding to a plurality of first beamforming patterns, and the first measured matrix comprises a plurality of first measured parameters respectively corresponding to the first beamforming vectors;
   wherein the millimeter wave channel estimation method further comprising generating the first beamforming matrix, wherein the step of generating the first beamforming matrix comprises:
   creating a basic compressive sensing matrix;
   performing a least squares estimation on the basic compressive sensing matrix to obtain a first least squares matrix;
   performing normalization on the first least squares matrix to obtain a normalized matrix;
   performing another least squares estimation on the normalized matrix to obtain a second least squares matrix; and
   multiplying the second least squares matrix by an inverse matrix of an angle matrix to obtain the first beamforming matrix.

7. The millimeter wave channel estimation method according to claim 6, further comprising:
   receiving signals from the millimeter wave channel according to a second beamforming matrix to generate a second measured matrix; and
   estimating and obtaining at least one signal gain corresponding to said at least one angle of arrival according to the second measured matrix, a gain compressive sensing matrix and said at least one angle of arrival;
   wherein the second beamforming matrix comprises a plurality of second beamforming vectors respectively corresponding to a plurality of second beamforming patterns, and the second measured matrix comprises a plurality of second measured parameters respectively corresponding to the second beamforming vectors.

8. The millimeter wave channel estimation method according to claim 7, further comprising generating the second beamforming matrix, wherein the step of generating the second beamforming matrix comprises:

creating a basic compressive sensing matrix;
performing a least squares estimation on the basic compressive sensing matrix to obtain a least squares matrix; and
multiplying the least squares matrix by an inverse matrix of an angle matrix to obtain the second beamforming matrix.

9. The millimeter wave channel estimation method according to claim 8, wherein the basic compressive sensing matrix is a Gabor frame.

10. The millimeter wave channel estimation method according to claim 1, wherein the basic compressive sensing matrix is a Gabor frame.

\* \* \* \* \*